United States Patent [19]

Austin

[11] 4,344,544

[45] Aug. 17, 1982

[54] FLUID PIPE GUARD DEVICE

[76] Inventor: Victor L. Austin, 9648 Cain Dr. NE., Warren, Ohio 44484

[21] Appl. No.: 209,745

[22] Filed: Nov. 24, 1980

[51] Int. Cl.³ ................................. B67C 3/00
[52] U.S. Cl. ............................. 220/86 AT; 220/86 R
[58] Field of Search .................... 220/86 AT, 86 R; 138/42; 15/104.16; 366/336, 339; 210/492.2, 496, 435

[56] References Cited

U.S. PATENT DOCUMENTS

| | | | |
|---|---|---|---|
| 422,117 | 2/1890 | Christofel | 15/104.16 |
| 1,156,683 | 10/1915 | Havlicek et al. | 15/104.16 |
| 1,766,916 | 6/1930 | MacLiver | 220/86 AT |
| 1,931,342 | 10/1933 | Broderick | 220/86 AT |
| 1,971,714 | 8/1934 | Harkness | 220/86 AT |
| 2,099,558 | 11/1937 | Dibelka et al. | 220/86 AT |
| 2,281,448 | 4/1942 | Mathey | 220/86 AT |
| 2,284,107 | 5/1942 | Sullivan | 220/86 AT |
| 2,371,241 | 3/1945 | Jaffa | 220/86 AT |
| 2,496,992 | 2/1950 | Glidden | 220/86 AT |
| 2,506,669 | 5/1950 | Henacker | 220/86 AT |
| 3,002,649 | 10/1961 | Turley | 220/86 AT |
| 3,016,162 | 1/1962 | Cioffi | 220/86 AT |
| 3,888,381 | 6/1975 | Russell, Jr. | 220/86 AT |
| 3,892,330 | 7/1975 | Hotchkiss | 220/86 AT |
| 3,920,145 | 11/1975 | McGregor et al. | 220/86 AT |
| 3,951,297 | 4/1976 | Martin | 220/86 AT |
| 3,985,259 | 10/1976 | Zell et al. | 220/86 AT |
| 3,990,602 | 11/1976 | Hollins | 220/86 AT |

*Primary Examiner*—William Price
*Assistant Examiner*—Gary Elkins
*Attorney, Agent, or Firm*—Michael Williams

[57] ABSTRACT

A device insertable into a fluid pipe to obstruct free passage of a solid member therethrough. The invention is particularly useful to prevent the siphoning of gasoline from an automobile tank. The improved device comprises an assembly of a conventional coil spring and a flexible tape extending through a length of the spring from one end, extending outwardly of the spring and then connected to convolution of the spring at a spaced place along the spring, the tape then being doubled back and extending through the eye in a head at one end of the tape. The assembly is inserted within the filler pipe of the gasoline tank and a pulling force is applied to a free part of the tape which is located outside of the filler pipe, while the upper end of the spring is held against substantial movement. The result is a doubling-up of the spring so that it crisscrosses and obstructs passage of a siphoning tube to the gasoline within the tank.

6 Claims, 5 Drawing Figures

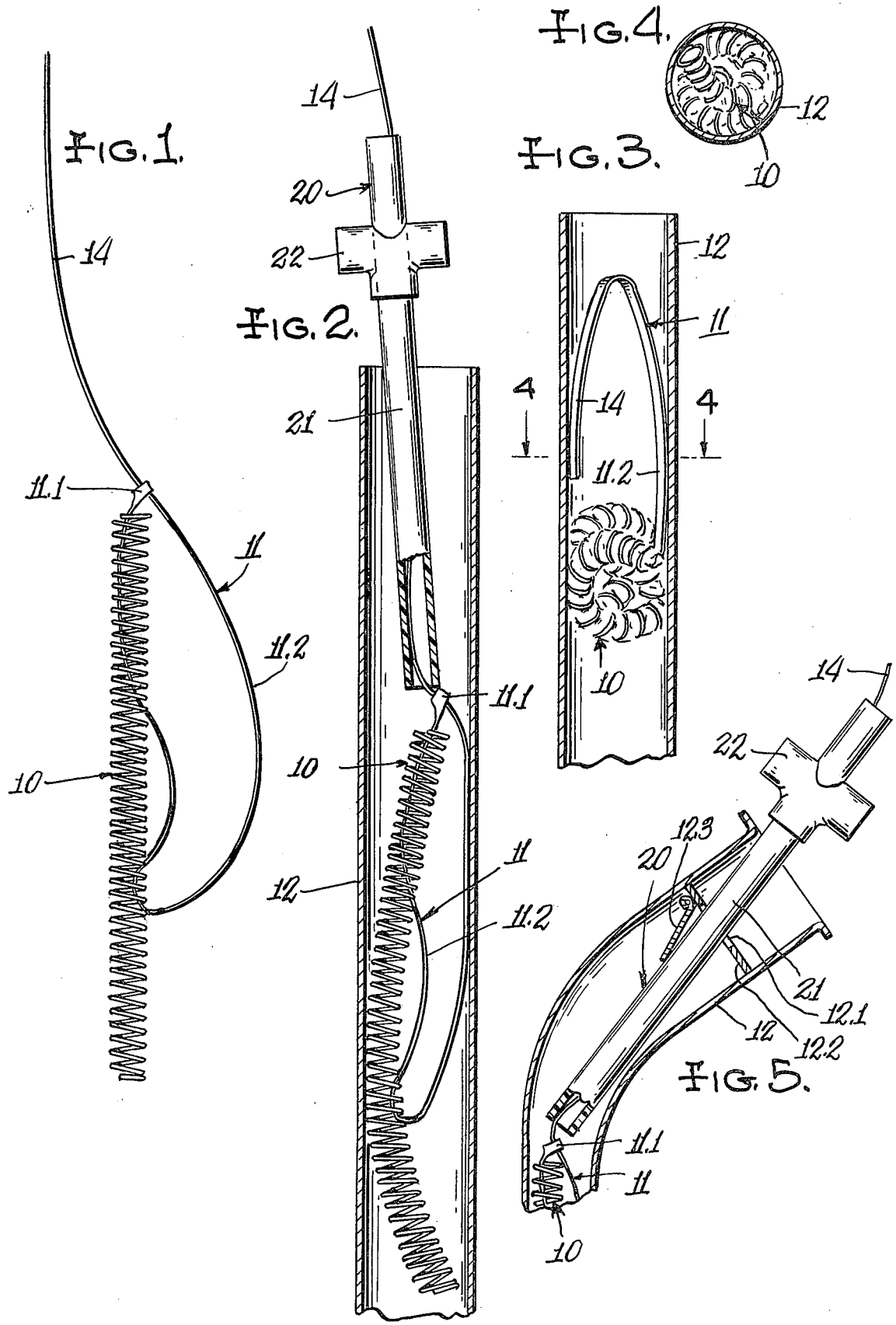

FLUID PIPE GUARD DEVICE

The prior art contains many patents relating to antisiphoning devices but insofar as applicant is aware, none has had extensive use and therefore it is assumed that none has had commercial appeal for some reason or other. My invention comprises components that are low in cost; are easily installed; and are effective in use.

DESCRIPTION OF THE DRAWING

In the drawing accompanying this specification and forming a part of this application, there is shown, for purpose of illustration, an embodiment which my invention may assume and in this drawing, FIG. 1 is a side elevational view of a coil spring assembled with a flexible tape in accordance with my invention, FIG. 2 is a longitudinal sectional view of a straight pipe (which may be a filler pipe for a gasoline tank) with the assembly of FIG. 1 inserted within the pipe ready for distortion of the coil spring from rectilinear formation, FIG. 3 is a view similar to FIG. 2, but with the coil spring doubled upon itself to form the antisiphoning barrier, FIG. 4 is a transverse sectional view, corresponding to the line 4—4 of FIG. 3 showing the crisscrossing of the coil portions, and FIG. 5 illustrates a filler pipe of curved formation with the assembly of my invention inserted for distortion to obstruct passage of a siphoning tube.

DESCRIPTION OF THE PREFERRED EMBODIMENT

My invention comprises a conventional coil spring 10 and a flexible tape 11. The tape is connected to the spring, as shown in FIG. 1, so that the assembly may be inserted within a tube or pipe 12. When a pulling force is applied to the free end of the tape, but with the adjacent end of the spring held against substantial movement, portions of the spring are doubled up on each other to form a crisscross structure (as seen in FIG. 3) which will obstruct passage of a siphon tube or the like (not shown) but which will not obstruct passage of fluid (particularly a liquid such as gasoline) through the tube 12, and into the tank.

The tube 12 may be the filler tube of a gasoline tank, or it may be for any other purpose wherein passage of a solid article (such as a siphon tube) is obstructed while fluid flow is permitted.

For antisiphoning purposes in a conventional gasoline filler pipe, the spring 10 is preferably helically-coiled wire having a gauge of about 0.072 inches (about 1.90 millimeters), a length of about 9.5 inches (about 24.2 centimeters), a uniform outside diameter of about $\frac{5}{8}$ of an inch (about 15.87 millimeters), and wound to provide about 44 evenly-spaced convolutions. Although it is preferable to form the spring 10 of metal, it is possible to form this spring of plastic, such as nylon or the like, providing enough tension can be produced. Further, it will be apparent that the specific spring sizes abovementioned may be varied to accomodate various situations, such as filler pipe sizes and the like, although one size may be adapted to work with various sizes and shapes of filler pipe. The flexible tape may be formed of any suitable material, either plastic or metal. .Found suitable for the purpose is a nylon cable tie sold by Thomas & Betts Company under the trademark TY-RAP. This cable tie has an integral head 11.1 at one end, the head having a slot to closely pass a band portion 11.2 of the tape, a marginal surface defining the slot having means cooperable with the band portion so that the latter may be pulled in a tightening direction, but movement in the opposite direction is opposed.

As seen in FIG. 1 the band portion is inserted into one end of the coil spring 10 until the head 11.1 abuts such end. The band portion is pulled out of the spring at about one-third the length of the spring, and reinserted into the spring about two-thirds the length of the spring and withdrawn therefrom after encompassing a couple of convolutions, and then inserted through the slot in the head 11.1.

The assembly is inserted into the tube or pipe 12 to a place where the obstruction is to be located and a pulling force is applied to the free end 14 of the cable tie while the upper end of the coil spring is held against substantial longitudinal movement. A tool 20 is shown in FIG. 2 which has been found suitable for holding the spring in position. This tool is formed as a plastic tube 21 having a cross head 22 fixed to an end portion thereof. The free end 14 of the cable tie is pulled through the tube 21 so as to be accessible from the upper end thereof. The cross head 22 offers a suitable handhold so that the tool 20 is held stationary with one hand as the pulling force is applied to the cable tie with the other hand. To apply sufficient pulling power without discomfiture to the hand, the use of a pliers or other similar device is recommended. Further, the tool or applicator 20 may be curved instead of rectilinear, to better cooperate with a curved filler pipe of the type shown in FIG. 5.

Because of the particular connection of the cable tie 11 with spaced portions of the coil spring, the pulling forces applied to the tape free end 14 causes spring portions to double upon themselves to a crisscross formation, such as shown in FIGS. 3 and 4. Since the band portion 11.2 may move through the slot in the head 11.1 in the pulling direction only, the coil spring cannot unwind from its balled-up condition. In this condition, the doubled portions of the spring exert considerable expanding force against the inner wall surface of the tube or pipe 12 so as to resist any force which may tend to move the balled-up coil in the tube.

When the free end portion 14 of the cable tie has been pulled sufficiently to crisscross the spring within the tube and to frictionally hold it within the latter, the tool 20 is withdrawn and the end portion 14 may be tucked within the tube, as seen in FIG. 3. Preferably, the tool 20 is used to push the free end portion 14 into the filler pipe far enough so that the extremity of the portion 14 is pushed inwardly past the crisscross formation to keep the tape-free end in place and out of the way. The balled-up coil spring traverses the interior of the tube 12 to provide an obstruction to the passage of an article, such as a siphon tube. Yet, sufficient transverse space remains between the spring convolutions so that gasoline may be pumped into the tank. The coil spring is preferably inserted far enough within the filler pipe so that the usual gasoline-dispensing nozzle (not shown) may be inserted into the free open end of the filler pipe.

As seen in FIG. 5, a curved filler pipe offers no problems to the use of my improved antisiphoning device. The pipe shown in FIG. 5 is representative of the types used for "no-leaded" gasoline wherein a restricted opening 12.1 is formed by a transverse partition 12.2 to pass only the smaller diameter of a "no lead" gasoline nozzle (not shown). In some cases, a pivoted spring-pressed flap 12.3 is provided to yieldably close the opening 12.1. The partition 12.2 may also be provided in a straight filler pipe, and provides the additional advantage of forming an abutment to positively prevent the balled-up spring from being pulled out of the filler pipe.

I claim:

1. An antisiphoning device for the filler tube of a gasoline tank, comprising, a normally-rectilinear, helically-coiled spring and a flexible tape having a head and a band portion extending from said head, said head having slot for passing said band portion, said band portion being inserted into said spring at one end thereof and coming out of said spring in the space between convolutions of said spring at a place spaced some distance from said spring one end, said tape being assembled with said spring in the manner specified and inserted through the opening into said filler tube and inwardly of the latter with said spring one end outermost, whereby when a pulling force is applied to said band portion to pull the latter through the slot in said head while said spring one end is held against longitudinal movement, said band portion is foreshortened to cause portions of said spring to overlap and crisscross the interior of said filler tube and thereby form an obstruction to restrict the passage of a siphon tube and the like but permitting sufficient openings by reason of the convolutions of said spring to permit gasoline to flow past said obstruction.

2. In combination with a tubular passageway, a helical coil spring having portions fixed in said passageway in adjoining overlapping relation to crisscross the latter and thereby form an obstruction to restrict passage of a relatively rigid solid member having a substantial transverse width past said spring, but providing sufficient openings by reason of the spacing between convolutions of said spring to permit a fluid to flow past said obstruction, said spring having a normally rectilinear formation, said portions thereof being displaced from rectilinear formation against forces tending to return said spring to its rectilinear formation, whereby parts of said portions are forcibly pressed against the inner surface of said passageway to hold said spring in position to form said obstruction, and, a flexible tape having a head portion in abutting relation with an end of said spring, said tape extending from said head portion through the space between convolutions of said spring at a place spaced some distance from said spring end, whereby when said spring in substantially rectilinear formation is placed within said passageway and a pulling force is applied to said tape in a direction toward said spring end while the latter is held against longitudinal movement, said spring doubles up within said passageway to said crisscross formation.

3. A device for blocking a tubular passageway so as to preclude insertion of a relatively rigid solid member therepast in said passageway, comprising, a normally generally rectilinear and elongated helically coiled spring having a length substantially greater than the width of the tubular passsgeway to be blocked, a tape having a head portion provided with a slot and an elongated strap portion extending therefrom, said head portion being disposed generally adjacent one end of said spring, said tape portion including a first length extending through said coiled spring in one direction within the convolutions thereof for a distance less than the length of said spring, a second length passing between adjacent convolutions at a point along said spring to extend externally of said spring between the ends thereof, and a third length connected to said second length and extending in the generally opposite direction to pass through said head portion slot to terminate in an elongated free end, whereby when said spring is held at one end adjacent said slot and said strap free end is pulled in said opposite direction, said spring is flexed and folded rearwardly upon itself wherein the resilient nature of said spring causes the flexed and folded portions thereof to bear frictionally against the walls of the tubular passageway into which the same is inserted in seeking to restore the rectilinear nature thereof thereby to block the passageway against said solid object insertion.

4. The device of claim 3 wherein said tape portion includes a further fourth length thereof connecting said second and third lengths, said fourth length extending from said second length in said one direction externally of said spring and thence reentering said spring between said convolutions and thereafter re-exiting said convolutions to connect to said third length.

5. The device of claim 4 wherein said second length is located at approximately one-third the length of said spring and said fourth length re-exits said convolutions at approximately two-thirds the length thereof.

6. The device of claims 3, 4, or 5 further including a relatively rigid tubular member having opposite ends through which said free strap end passes thereby to dispose said head portion adjacent one end of said tubular member and the terminal portion of said strap free end extending from the other end of said member in effecting folding and flexing of said spring.

* * * * *